United States Patent
Odinak et al.

(10) Patent No.: US 6,766,233 B2
(45) Date of Patent: Jul. 20, 2004

(54) MODULAR TELEMATIC CONTROL UNIT

(75) Inventors: Gilad Odinak, Bellevue, WA (US); Stephen H. Langenbeck, Snohomish, WA (US)

(73) Assignee: Intellisist, LLC, Bellevue, WA (US)

( * ) Notice: Subject to any disclaimer, the term of this patent is extended or adjusted under 35 U.S.C. 154(b) by 0 days.

(21) Appl. No.: 09/955,474

(22) Filed: Sep. 17, 2001

(65) Prior Publication Data

US 2002/0173889 A1 Nov. 21, 2002

Related U.S. Application Data

(60) Provisional application No. 60/291,203, filed on May 15, 2001.

(51) Int. Cl.[7] .................................................. G06F 7/00
(52) U.S. Cl. ............................... 701/36; 701/29; 701/31; 701/32; 340/426.1
(58) Field of Search ................................ 701/29, 31, 32, 701/34, 35, 36, 33; 307/10.7; 340/825.29, 815.4, 426.1, 425.5; 359/879

(56) References Cited

U.S. PATENT DOCUMENTS

| | | | |
|---|---|---|---|
| 5,940,503 A | * | 8/1999 | Palett et al. ................. 379/454 |
| 6,019,475 A | * | 2/2000 | Lynam et al. ................ 359/879 |
| 6,202,008 B1 | * | 3/2001 | Beckert et al. ................ 701/33 |
| 6,243,003 B1 | * | 6/2001 | DeLine et al. ........... 340/425.5 |
| 2001/0030598 A1 | * | 10/2001 | Deline et al. ............ 340/425.5 |
| 2002/0113203 A1 | * | 8/2002 | Heslin et al. ................ 250/239 |
| 2002/0158753 A1 | * | 10/2002 | DeLine et al. .............. 340/426 |
| 2003/0169160 A1 | * | 9/2003 | Rodriguez et al. ....... 340/426.1 |

* cited by examiner

Primary Examiner—Marthe Y. Marc-Coleman
(74) Attorney, Agent, or Firm—Black, Lowe and Graham PLLC

(57) ABSTRACT

A vehicle device system that combines the functionalities of integrating vehicle controls, monitoring systems, location tracking and wireless communications into a device with module receptacles to receive insertable modules that are replaceable, transferable, and upgradeable for performing one of a plurality of telematic functions.

19 Claims, 6 Drawing Sheets

MODULAR TELEMATIC CONTROL UNIT

PRIORITY CLAIM

This application claims priority from U.S. Provisional Application Ser. No. 60/291,203 filed May 15, 2001, Attorney Docket No. WING-1-1014.

FIELD OF THE INVENTION

This invention relates generally to the field of telematics processing, and to a system that combines the functionalities of integrating vehicle controls and monitoring systems with location tracking and wireless communication.

BACKGROUND OF THE INVENTION

Generally, a telematic control unit refers to a system that combines telecommunications and information processing. The term has evolved to refer to automobile systems that combine global positioning system (GPS) satellite tracking and wireless communications for automatic roadside assistance and remote diagnostics. This combination provides consumers with a multitude of services not previously available.

Although the telematic unit produces acceptable results, the technology of the unit fails to provide consumers with an ability to extend the life cycle or shelf life of the unit. In other words, over time the technology implemented in the unit becomes obsolete. Moreover, a telematic unit produced for a variety of fleet vehicles consists of common functions and implementations. Ultimately, consumers must pay the higher costs of upgrading and implementing newer technological advances. Thus, vehicle owners would have to purchase newer units that contain improved or advanced features and must accordingly absorb the costs of removing the old unit and installing the improved unit.

In light of these problems, there is a need for a modular telematic unit that is easily upgradeable to reduce the various burdens of upgrading that are placed on the vehicle owner.

SUMMARY OF THE INVENTION

The present invention provides a vehicle device that combines the functionalities of integrating vehicle controls, monitoring systems, location tracking and wireless communications into a vehicle device with module receptacles to receive insertable modules that are replaceable, transferable, and upgradeable. The modules include functions for performing one of a plurality of telematic functions.

The vehicle device includes a communication component, one or more removable modules, one or more module receptacles, memory, and a processor. The communication component communicates with a destination over a network. Each of the one or more removable modules performs at least one function. The one or more module receptacles receive the one or more removable modules. The processor is coupled to the memory, the one or more module receptacles, and the communication component.

In accordance with further aspects of the invention, the vehicle device also includes a user interface with an input device, a microphone, a display, and speakers.

In accordance with other aspects of the invention, the vehicle device is in part implemented in the vehicle's rear view mirror.

In accordance with still further aspects of the invention, the modules include a processing module, a positioning module, a phone adapter module, a wireless network communication module, or a memory module.

In accordance with yet other aspects of the invention, the modules are insertable into one or more devices remote from the vehicle, such as a PDA (Personal Data Assistant), a data reader, into another vehicle device, or home computer.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
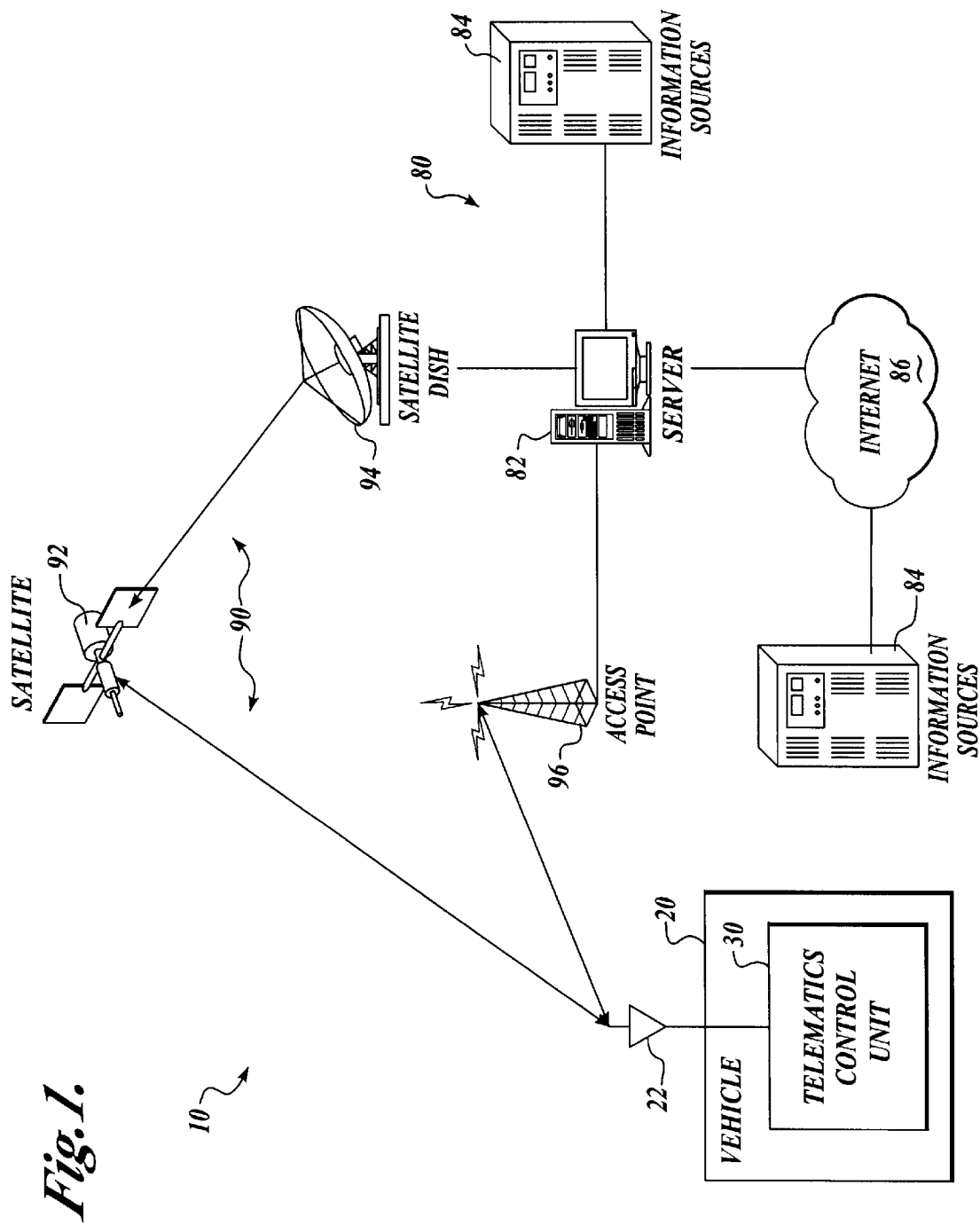
FIG. 1 is a system overview of a telematic control unit in accordance with the present invention.

The present invention provides a telematic control system with upgradeable modular components to combine the functionalities of integrating vehicle controls and monitoring systems with location tracking and wireless communication. By way of overview and with reference to FIG. 1, the system 10 of the present invention includes a user system 20 in wireless data communication with a server system 80 via a wireless data channel 90. User system 20 includes a wireless communications device 22 for transmitting and receiving wireless information between user system 20 and server system 80, and a telematic control unit (TCU) 30 for allowing the user to perform various interactive functions. User system 20 is preferably implemented in a mobile environment, such as in a car or other vehicle. TCU 30 may be mounted, either permanently or removably, at one of various locations within the vehicle, e.g., glove box, center console (between the seats), and fuse box. The TCU may consist of a separate, stand-alone unit, or be integrated as a component in a car radio or other vehicle-based device. In a preferred embodiment, TCU 30 is housed within a rear-view mirror. (See FIGS. 5A and 5B).

Server system 80 includes a server 82 for housing user system information, as well as processing and responding to requests for information from the user system and information sources 84, which may be integral with or independent from server system 80. The information sources store information subject to requests from the user system. In the preferred embodiment, the server includes a processor, a memory, and a database (not shown). Server 82 may be in communication with information sources 84 via direct access (e.g., hard-wired or point-to-point connection) as well as over Internet 86. Server system 80 further includes a means for sending and receiving information to and from vehicle 20, discussed below. Server system 80 processes and responds to the requests for information it receives from TCU 30.

Wireless data channel 90 facilitates communication of instructions and information between vehicle 20 and server system 80. In a preferred embodiment, the wireless data channel may include a satellite system 92 in combination with a satellite dish 94 along with or in the place of an access point 96, the latter as part of a cellular or other wireless transmission network. In operation, instructions are transmitted from vehicle 20 via communication device 22 to either the satellite system or access point, which in turn communicate the instructions to server 82, in the former case via satellite dish 94. Conversely, information may be communicated from the server to the user system along a reverse direction of the identified route.

As further shown with reference to FIG. 2, TCU 30 includes a processor 32, a built-in global positioning system (GPS) unit 34, a cellular device 36, such as a cellular modem, for transmitting and receiving wireless information via wireless communications device 22, a vehicle information component 38, a user interface 40, and a module device 50 (discussed below). Vehicle information component 38 extracts information related to the vehicle's sensory status, such as engine specification, door lock/unlock status, and airbag deployment requirements from vehicle 20. User interface 40 includes one or more of a microphone 42 for capturing the user's voice, a speaker 44, a display 46, such as a touch sensitive screen, and interface entry 48 for allowing the user to perform various interactive functions. TCU 30 communicates via wireless data channel 90 with server system 80.

Figure 3:
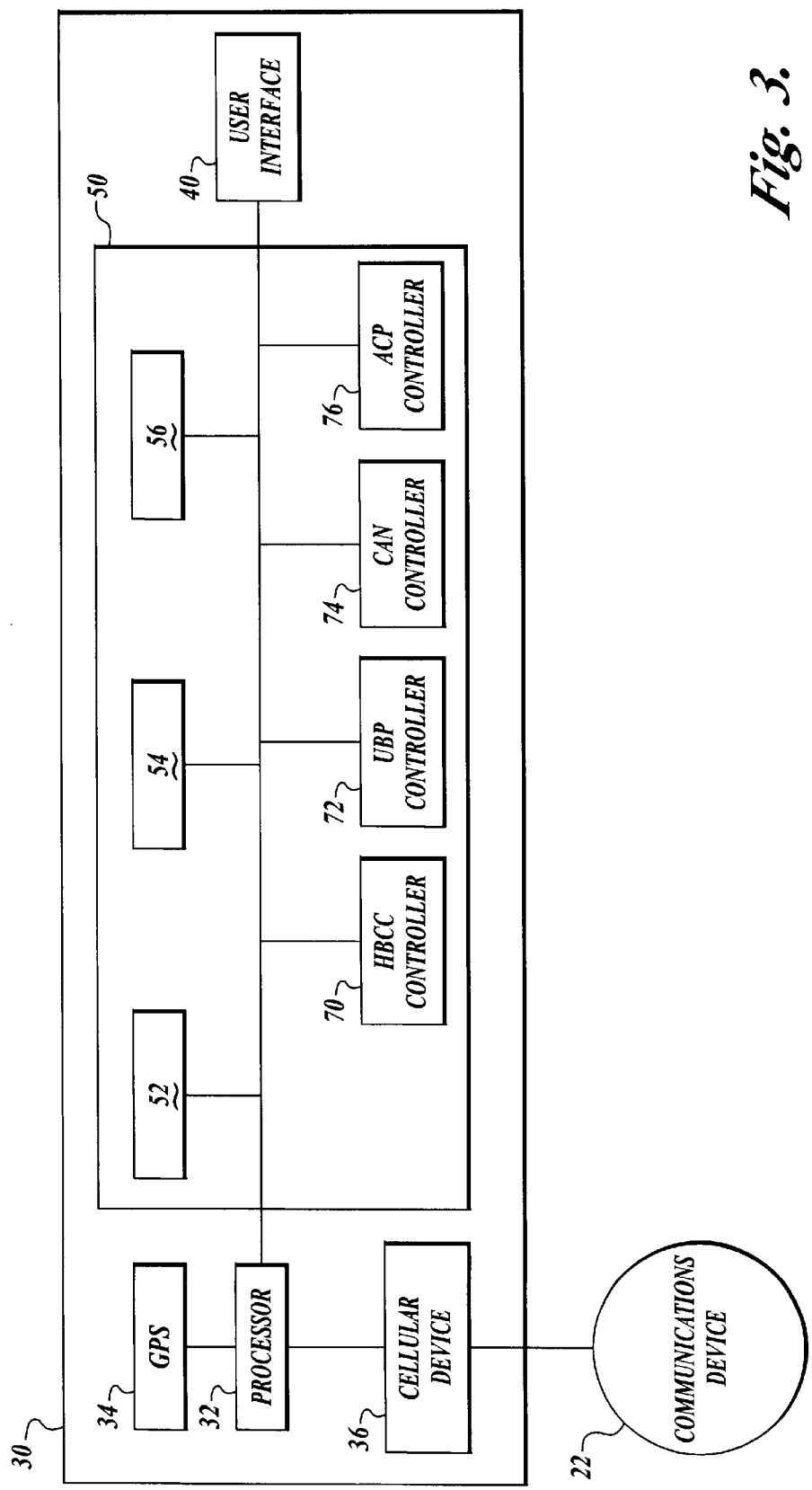
FIGS. 3 and 4 are block diagrams of exemplary embodiments of the present invention.

FIG. 3 is a block diagram of an exemplary embodiment of TCU 30 in accordance with the present invention, describing more specifically module device 50. Module device 50 is preferably configured to receive removable modules such as standard PCMCIA (Personal Computer Memory Card International Association) or CF (Compact/Flash) cards. More specifically, module device 50 consists of a case with receptacles 52–56 for receiving various modules. It also includes electronic circuitry for connecting the different insertable modules to processor 32, to each other, and to other devices and buses included in TCU 30. Alternative embodiments of module device 50 include a Universal Serial Bus (USB) connector, microphone and speaker amplifiers, and a Hall effect sensor to implement a magnetic compass.

Figure 2:
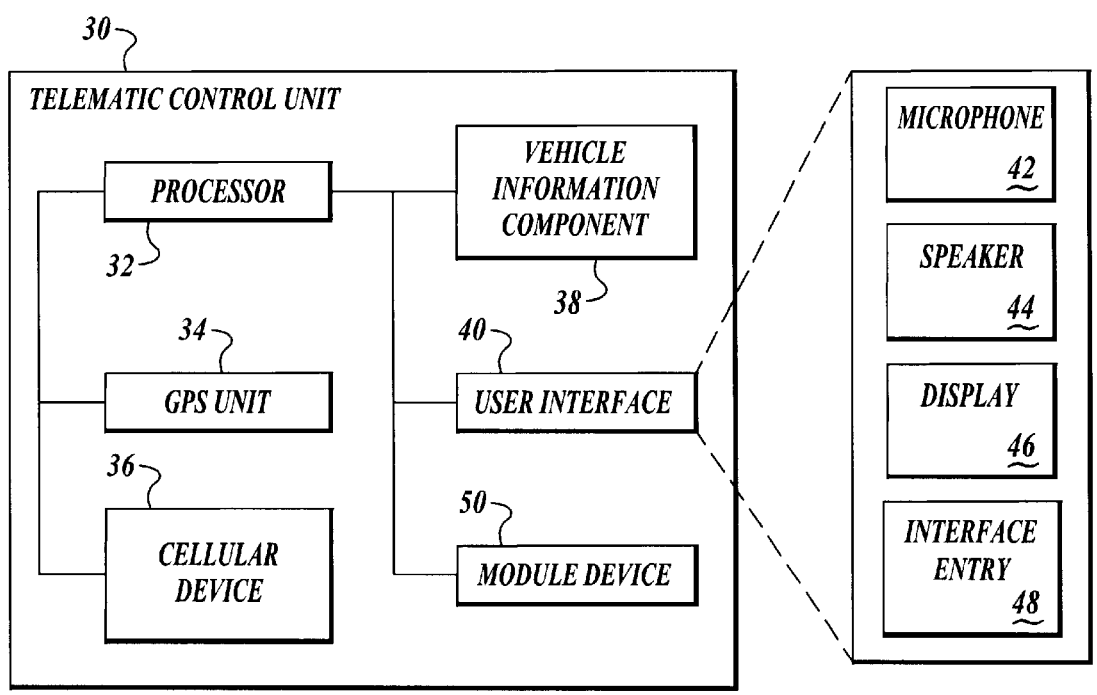
FIG. 2 is an overview of a telematic control unit of the present invention.
Figure 4:
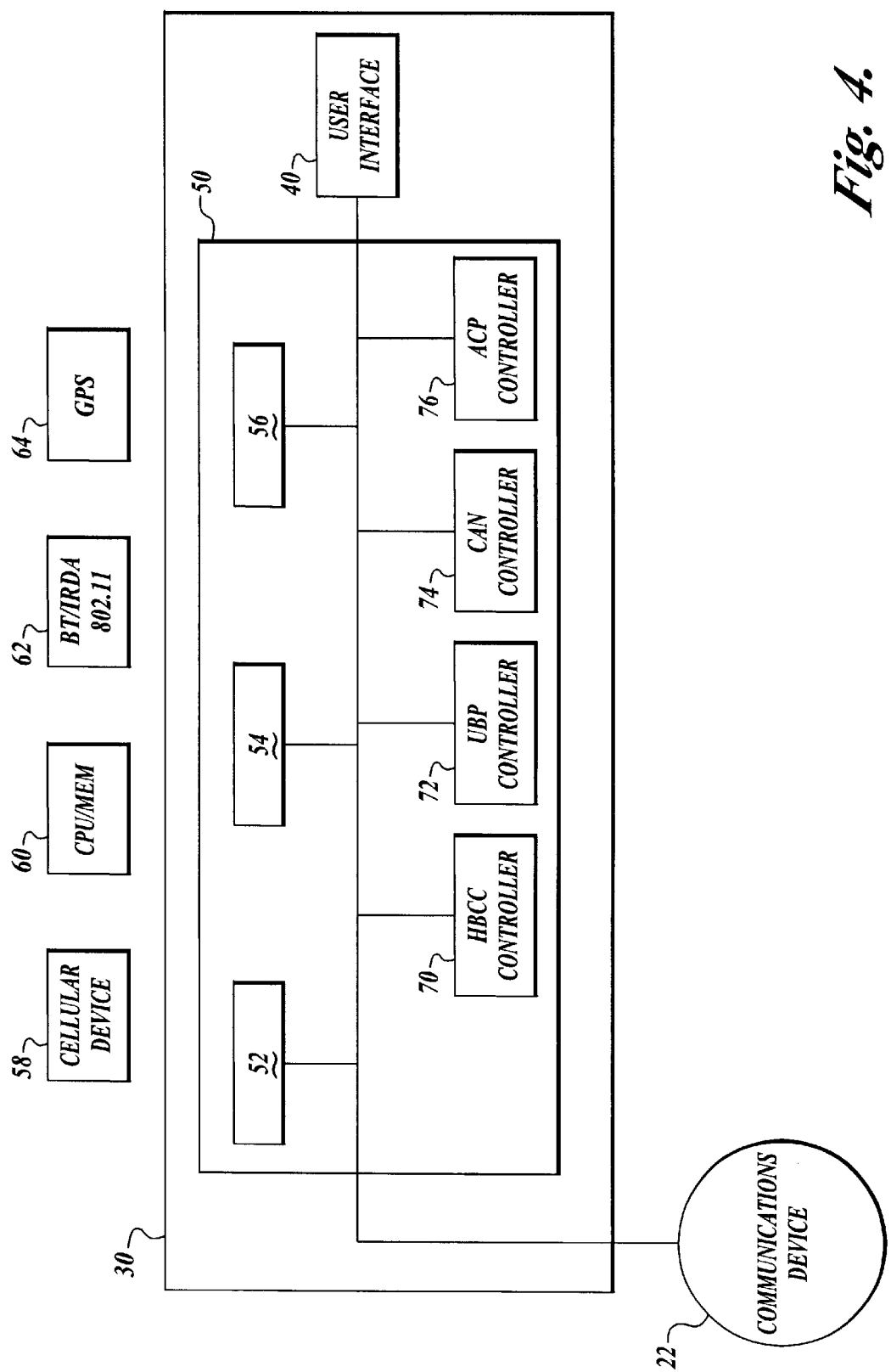

In an alternative embodiment, TCU 30 may include less than all components shown in FIG. 2. For example, as shown in FIG. 4, TCU 30 may be operable as a component system, and include only user interface 40 and module device 50, connected to communications device 22. In this embodiment, processing, memory, GPS location information, and cellular communications is provided solely through upgradeable modules. The modules used in receptacles 52–56 of module device 50, in both this and other described embodiments, may provide varied functionality, and include, by way of example only, a cellular device module 58, a CPU/memory module 60, a BT/IRDA (Blue Tooth/Infra Red Data Association) or 802.11 wireless network communication module 62, and a global positioning system (GPS) module 64. In one embodiment, CPU module 60 includes a main processor (CPU), random access memory (RAM), and non-volatile program memory (ROM/FLASH). Alternatively, CPU module 60 comprises a digital signal processor (DSP) in addition to the above-mentioned items.

In yet another alternative embodiment, module device 50 uses a pre-existing cellular phone, which connects via a special adapter to the module device. The adapter may be in the form of a cellular radio or it may connect via a USB port (not shown). In this embodiment, microphone 42 connects to CPU module 60 or processor 32. CPU module 60 performs some or all the in-vehicle processing, and may use cellular device module 58 to send the in-vehicle processing results to server system 80. CPU module 60 is preferably a separate module. A single module may integrate more than one function, such as a combined cellular radio and GPS receiver. Processor 32 digitizes a voice recorded from a microphone. The digitized voice is then sent to CPU module 60, which performs further sound processing. Replaceable modules allow a user to receive up-to-date sound processing software or other more advanced modules without having to replace any hardware components already installed in the vehicle.

In an alternative embodiment, CPU module 60 is removable from module device 50 and usable in a separate module device remote from the vehicle, such as a data reader or a display unit. Moreover, the removable modules are insertable into one or more devices remote from the vehicle. Alternative devices remote from a vehicle include but are not limited to hand held devices, home computers, and personal data assistants (PDA), etc. This allows the user the flexibility of using CPU module 60 (or other modules) outside the vehicle. Alternatively, a user can plug CPU module 60 in a different vehicle. Thus, users can transport personalized settings from one vehicle to another, or from one device to another.

In yet another alternative embodiment, the user can remove or replace a small plug-in memory module (not shown), for example in MMC (Multi-Media Card) format, from within CPU module 60. This memory module stores personalized settings and data. The memory module is also used as a security device to enable or disable features of TCU 30. Moreover, the memory module can store credit card information, personal identification, and memory storage for the CPU's programs.

Included within or electrically coupled to module device 50 or processor 32 are one or more controllers for communicating with various vehicle data buses, such as the HBCC (Hosted Bus Controller Chip) 70, the UBP (Universal Bus Protocol) 72, the CAN (Controller Area Network) 74, the ACP (Audio Control Protocol) 76, or other data buses. HBCC 70 is a chip that implements Ford's J1850 in-vehicle bus standard, called SCP (Standard Corporate Protocol). CAN 74 is a common bus interface used in most vehicles, and ACP 76 is a different vehicle bus protocol. Processor 32 is coupled to multiple controllers 70–76 and to one or more module receptacles 52–56. Module device 50 preferably connects to the user interface 40 (microphone 42, speakers 44, monitor 46, and keyboard 48).

Figure 5A:
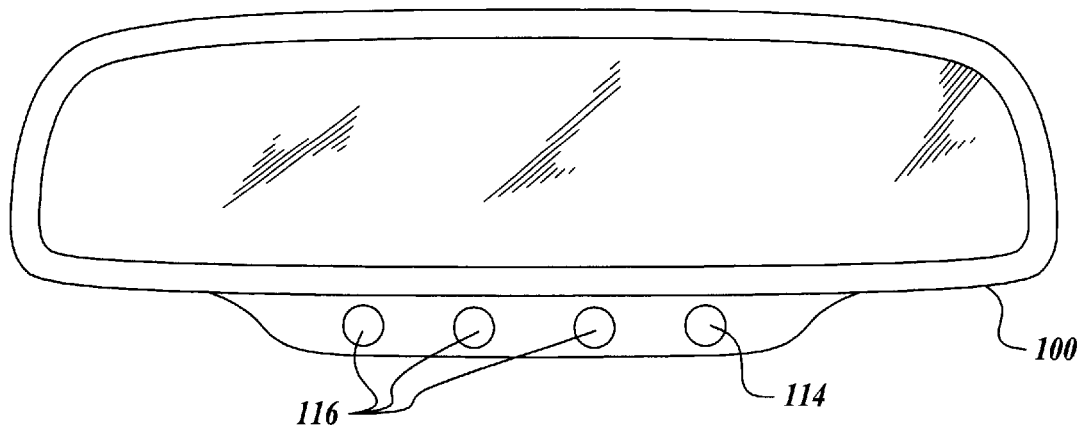
FIGS. 5A and 5B are a front and a rear view of the telematic control unit housed within a rear view mirror.
Figure 5B:
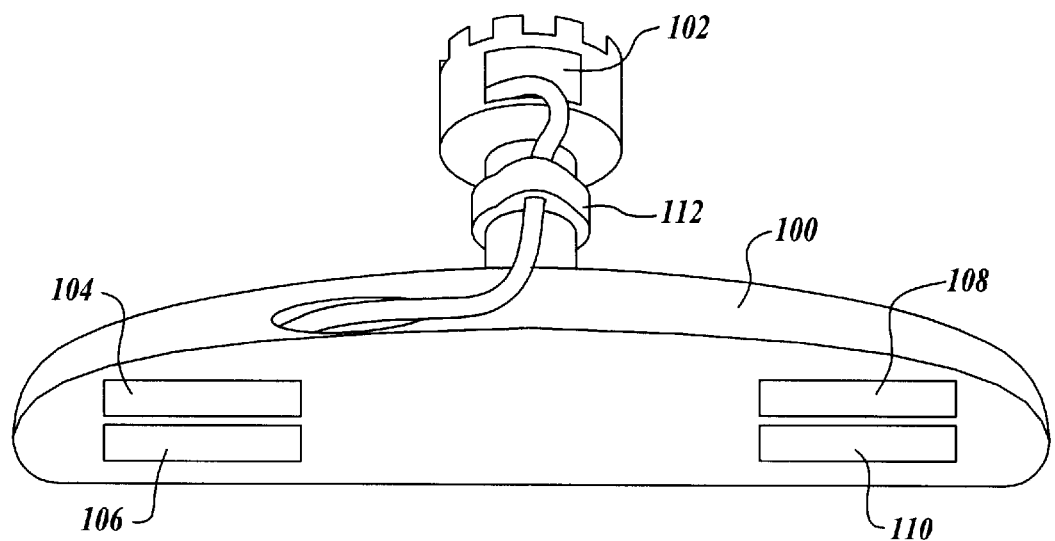

FIGS. 5A and 5B show front and bottom views, respectively, of an embodiment of the present invention wherein at least a portion of TCU 30 is housed within a rearview mirror. Mirror housing 100 includes one or more components of module device 50. Housing 100 is connected to a stand portion 102 that is secured to the vehicle windshield or to structural components within the vehicle. Mirror housing 100 includes receptacles 104–110 located on a bottom side of the housing. Receptacles 104–110 receive various modules and provide coupling of the modules to processor 32 (not shown) located within housing 100 or elsewhere in the vehicle via a cable connector 112. Cable connector 112 also supplies power to the components in housing 100 and the modules. Located on the front side of mirror housing 100 are a microphone 114 and various user interface buttons 116. In another embodiment, mirror housing 100 includes a speaker (not shown). Mirror stand portion 102 includes one or more communication devices, such as antennas (not shown) for receiving various signals, such as radio or GPS signals.

Figure 6A:
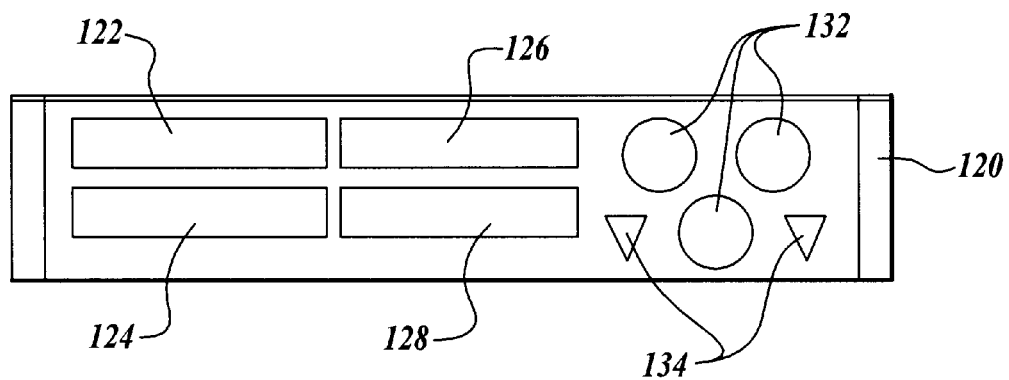
FIGS. 6A and 6B are a front and rear perspective view of the telematic control unit secured within an in-dash housing.
Figure 6B:
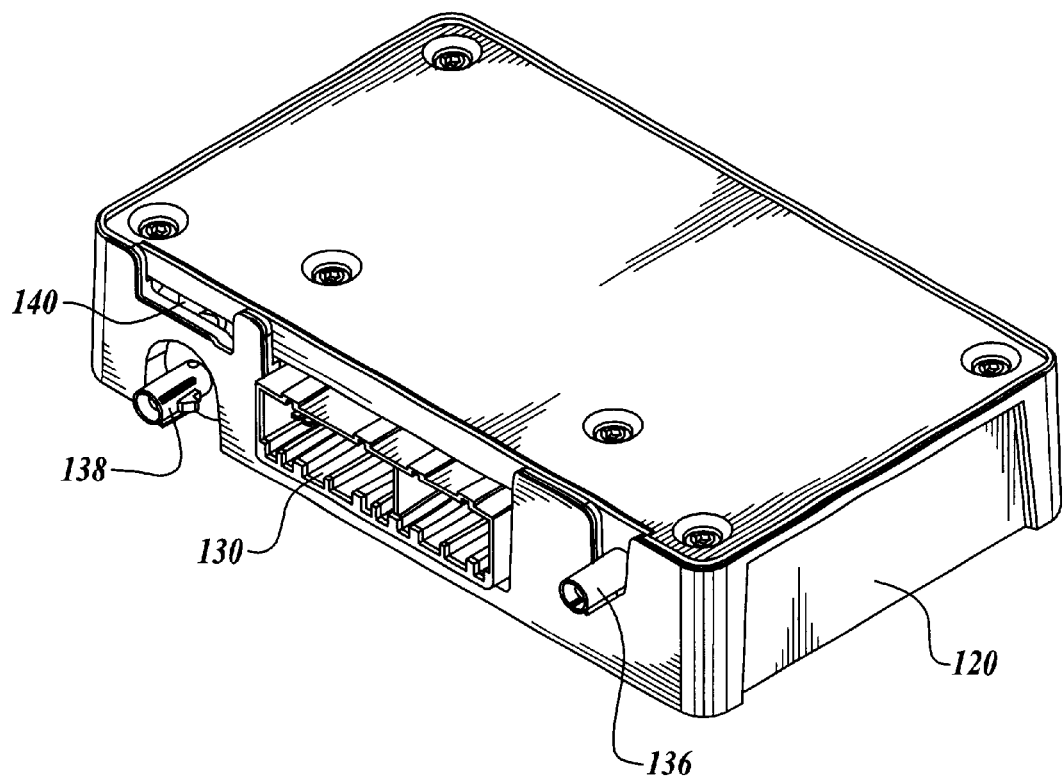

FIGS. 6A and 6B show a front and rear perspective view, respectively, of an alternative embodiment of the present invention wherein at least a portion of TCU 30 is secured within an in-dash housing 120. Housing 120 includes one or more components of module device 50. Housing 120 is secured within the vehicle dash or to another structural component within the vehicle. Housing 120 includes receptacles 122–128, located on the front side of the housing. Receptacles 122–128 receive various modules and provide coupling of the modules to processor 32 (not shown) located within housing 120 or elsewhere in the vehicle via a cable connector 130. Cable connector 130 also supplies power to the components in housing 120 and the modules. The front side of housing 120 may also include various user interface buttons 132, along with other user interface connectors 134, which may be used to connect the TCU to additional external user interface devices, such as a speaker, microphone, or keyboard. The TCU may also be coupled to user interface devices located in other parts of the vehicle via cable connector 130. Housing 120 further includes one or more communication devices, such as a GPS antenna 136 and a global system for mobile telecommunications (GSM) or cellular communications antenna 138 for receiving various signals. Housing 120 may also include a subscriber identity module (SIM) slot 140 to receive an electronic card for use in authorizing GSM communications.

While the preferred embodiment of the invention has been illustrated and described, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A vehicle device comprising
   one or more removable processing modules, wherein each of the one or more removable processing modules is configured to perform at least one signal or data processing function;
   a rear view mirror comprising one or more processing module receptacles configured to receive and electrically couple to the one or more removable processing modules;
   memory; and
   a processor coupled to the memory and the one or more module receptacles, wherein the module receptacles are embedded within the rearview mirror.

2. The vehicle device of claim 1, wherein the rear view mirror includes a user interface, wherein the user interface includes a microphone configured to receive user voice input and a speaker.

3. The vehicle device of claim 1, wherein the processor is coupled to at least one speaker and at least one microphone.

4. The vehicle device of claim 1, further comprising a communication component configured to communicate with a destination over a network, wherein the communication component communicates wirelessly.

5. The vehicle device of claim 1, wherein the one or more modules comprises at least one of a processing module, a positioning module, a cellular device module, or a wireless network communication module.

6. The vehicle device of claim 1, wherein the one or more removable modules are insertable into one or more devices remote from the vehicle.

7. The vehicle device of claim 6, wherein the one or more devices remote from the vehicle is a hand-held device.

8. The vehicle device of claim 6, wherein the one or more devices remote from the vehicle is a home computer.

9. The vehicle device of claim 1, wherein a function performed by at least one of the one or more removable modules is at least one of a cellular radio function or a global positioning receiver function.

10. The vehicle device of claim 1, wherein a function performed by at least one of the one or more removable modules is a central processing function for processing user initiated transactions.

11. The vehicle device of claim 1, wherein a function performed by the one or more removable modules is digital signal processing.

12. The vehicle device of claim 1, wherein a function performed by the removable modules is wireless transmission of data.

13. The vehicle device of claim 1, wherein the at least one function is storing data.

14. A vehicle device comprising
    one or more removable processing modules, wherein the one or more removable processing modules is configured to perform at least one signal or data processing function;
    a rear view mirror including
       one or more module receptacles embedded within the rearview mirror and configured to receive and electrically couple to the one or more removable processing modules; and
       a user interface for allowing a user to interact with the vehicle device;
    a communication component configured to communicate with a destination over a network, wherein the communication component communicates wirelessly;
    memory; and
    a processor coupled to the user interface, memory, communication component, and the one or more module receptacles.

15. The vehicle device of claim 14, wherein the user interface includes a microphone configured to receive user voice input and a speaker.

16. The vehicle device of claim 14, wherein the one or more modules comprises at least one of a processing module, a positioning module, a cellular device module, a global positioning receiver, or a wireless network communication module.

17. The vehicle device of claim 14, wherein the at least one function performed by at least one of the one or more removable modules is at least a central processing function for processing user initiated transactions.

18. The vehicle device of claim 14, wherein the at least one function performed by at least one of the one or more removable modules is digital signal processing.

19. The vehicle device of claim 14, wherein the one or more removable modules are insertable into one or more devices remote from the vehicle.

* * * * *